(12) United States Patent
Leijten

(10) Patent No.: US 7,873,813 B2
(45) Date of Patent: Jan. 18, 2011

(54) VARIABLE LENGTH VLIW INSTRUCTION WITH INSTRUCTION FETCH CONTROL BITS FOR PREFETCHING, STALLING, OR REALIGNING IN ORDER TO HANDLE PADDING BITS AND INSTRUCTIONS THAT CROSS MEMORY LINE BOUNDARIES

(75) Inventor: Jeroen Anton Johan Leijten, Eindhoven (NL)

(73) Assignee: Silicon Hive B.V., Eindhoven (NL)

( * ) Notice: Subject to any disclaimer, the term of this patent is extended or adjusted under 35 U.S.C. 154(b) by 791 days.

(21) Appl. No.: 10/059,427

(22) Filed: Jan. 29, 2002

(65) Prior Publication Data

US 2002/0116598 A1    Aug. 22, 2002

(51) Int. Cl.
*G06F 9/30* (2006.01)
(52) U.S. Cl. ..................................... 712/205
(58) Field of Classification Search ............... 712/237, 712/207, 205, 24
See application file for complete search history.

(56) References Cited

U.S. PATENT DOCUMENTS

| | | | | |
|---|---|---|---|---|
| 5,644,744 A | * | 7/1997 | Mahin et al. ............... | 712/207 |
| 5,819,058 A | * | 10/1998 | Miller et al. ............... | 712/210 |
| 5,983,336 A | * | 11/1999 | Sakhin et al. .............. | 712/24 |
| 6,134,633 A | | 10/2000 | Jacobs ....................... | 711/137 |
| 6,546,478 B1 | * | 4/2003 | Keller et al. ............... | 712/204 |
| 6,684,319 B1 | * | 1/2004 | Mohamed et al. .......... | 712/24 |

FOREIGN PATENT DOCUMENTS

| | | |
|---|---|---|
| EP | 0449369 A2 | 2/1991 |
| WO | 9743710 A2 | 11/1997 |
| WO | 9802798 A1 | 1/1998 |
| WO | WO9827486 | 6/1998 |
| WO | WO0033179 | 8/2000 |

* cited by examiner

*Primary Examiner*—Eddie P Chan
*Assistant Examiner*—Jacob Petranek
(74) *Attorney, Agent, or Firm*—Leydig, Voit & Mayer Ltd.

(57) ABSTRACT

A computer system with a processing unit and a memory. The processing unit is arranged to fetch memory lines from the memory and execute instructions from the memory lines. Each memory line is fetched as a whole and is capable of holding more than one instruction. An instruction comprises information that signals explicitly how the processing unit, when processing the instruction from a current memory line, should control how a part of processing is affected by crossing of a boundary to a subsequent memory line. The processing unit responds to the information by controlling said part as signaled by the information.

9 Claims, 3 Drawing Sheets

VARIABLE LENGTH VLIW INSTRUCTION WITH INSTRUCTION FETCH CONTROL BITS FOR PREFETCHING, STALLING, OR REALIGNING IN ORDER TO HANDLE PADDING BITS AND INSTRUCTIONS THAT CROSS MEMORY LINE BOUNDARIES

FIELD OF THE INVENTION

The present invention relates to instruction fetching in a computer system.

BACKGROUND OF THE INVENTION

It is known to compress VLIW (Very Large Instruction Word) instructions. In order to reduce the code size it is common to use variable length instruction formats. However, the instruction fetch hardware required to handle such variable length instruction formats tends to become complicated. Various solutions have been applied to control the instruction fetch.

WO 98/02798 discloses a superscalar microprocessor having an instruction alignment unit. The instruction alignment unit transfers a fixed number of instructions from an instruction cache to each of a plurality of decode units. The instructions are selected according to a predecode tag including start-byte bits that indicate which bytes are the first byte of an instruction. The beginning of an instruction may thus be identified for the purpose of decompressing the compressed instructions.

U.S. Pat. No. 6,134,633 and WO 9743710 which relate to the Trimedia processor, there is disclosed a method of expanding variable length VLIWs at high clock speeds. The instruction decoding logic is pipelined, which means that the header must be available one cycle before the operation segments. Therefore, the header bits of a given variable length instruction are stored together with the variable length instruction preceding that specific instruction in program memory. However, this has special consequences for branch targets. Because a branch target can be entered from different origins, a unique preceding instruction cannot be determined. This would mean that decompression of a branch target can start only after the branch has been taken, resulting in loss of execution cycles. To prevent such a loss branch targets are not compressed, resulting in a high penalty in code size.

To obtain dense code for VLIW processors, VLIW instructions should preferably be compressed. This results in a variable number of instruction bits required per clock cycle. Fetching and decoding these instruction bits on time requires a decoder that can deduct from the instruction bits itself how many bits are required to decode the instruction, and consequently where the next instruction starts. This process involves a feedback loop in the decoder, where the decoding of the current instruction has impact on the decoding of the next instruction, namely the determination of the position in program memory where the next instruction is located.

The feedback loop potentially slows down processing, especially when the instructions are fetched batched in memory lines that can contain (parts of) more than one instruction. To determine when a new memory line should be (pre-)fetched, it is necessary to determine when the position in memory of the next instruction crosses a boundary between memory lines.

Speeding up the feedback loop by pipelining, i.e. by decompressing a succeeding instruction while executing the current instruction, is impossible since this would directly influence the rate at which instructions can be fetched. For example, adding one pipeline stage could mean that only one instruction per two clock cycles can be fetched, instead of one instruction every clock cycle.

Another disadvantage is that, in order to enable fetching of branch targets on time, a complete target instruction must fit on a single program memory line. (Instructions are regarded as having been fetched 'on time' when a new instruction may be taken into execution every cycle, that is, if the instruction is available for a first stage of processing (which includes decompression) as soon as the first stage of processing the preceding instruction has been completed). If the branch target is not compressed the probability is small that the instruction fits in a memory line when it follows another instruction in that memory line. Therefore such a target instruction is realigned to the start of another program memory line and padding bits are added in the original memory line, thereby increasing the code size even more.

SUMMARY OF THE INVENTION

It is an object of the present invention to provide a computer system that allows for a dense code while at the same time maintaining the processing performance at a relatively high level.

It is a further object of the present invention to provide a computer system which eliminates several costly calculations that are normally necessary to control fetching.

It is another object of the invention to provide for a method of executing programs with such a computer system, for programs for such a computer system and for a method of generating programs for such a computer system.

The invention provides for a computer system with a processing unit and a memory, the processing unit being arranged to fetch memory lines from the memory and execute instructions from the memory lines, each memory line being fetched as a whole and being capable of holding more than one instruction, at least one instruction comprising information that signals explicitly how the processing unit, when processing the instruction from a current memory line, should control how a part of processing is affected by crossing of a boundary to a subsequent memory line, the processing unit being arranged to respond to the information by controlling said part as 'signaled by the information.

Because the instruction signals explicitly in the instruction how crossing of boundaries must be controlled, the computer system can proceed to handle the effects of boundary crossing in advance and without delay. For example, with an appropriate explicit signal new memory lines can be fetched without delay when necessary, with another explicit signal the program counter can be realigned to a new program line before padding bits are processed and with yet another explicit signal processing can be stalled immediately if another memory line is needed to process a branch target.

"Explicit signaling" distinguishes from implicit signaling, such as when the need to prefetch a memory line follows from the current program counter and a computed length of the instruction. Thus, control over operations relating to prefetching is simplified and speeded up by explicit signaling. In contrast to information with an implicit signal, information with an explicit signal in isolation does not provide sufficient information for controlling actions other than the action controlled by the explicit signal.

Preferably all instructions in a program comprise such information, irrespective of the type of instruction, be it a load instruction, a store instruction, an add instruction etc. In an embodiment part or whole of the information may be omitted from some instructions, for example in an embodiment signals about prefetching and stalling are omitted from an instruction that is located at the start of a memory line.

In an embodiment of the computer system according to the invention, the instruction in a current memory line signals explicitly whether a subsequent memory line must be fetched because at least part of a subsequent instruction is stored in a subsequent memory line. Thus the subsequent memory line can be fetched without delay when needed. This avoids loss of instruction cycles due to waiting for the next memory line and it avoids unnecessary fetching of memory lines. Preferably, signal to fetch the next memory line is a bit in the instruction dedicated to this purpose.

In an embodiment of the computer system according to the invention, a current instruction in a current memory line signals explicitly whether the program counter has to skip padding in a remaining part of the current memory line to advance to a start of the subsequent memory line. This is particularly useful when the next instruction (at the start of the subsequent memory line) is an uncompressed branch target instruction, which does not fit after the current instruction in the current memory line. Using the signal to realign execution of this instruction can be started without delay to determine from the padding whether or not to realign. Preferably, signal to realign is a bit in the instruction dedicated to this purpose.

In an embodiment of the computer system according to the invention, a current instruction in a current memory line signals explicitly whether processing of the instruction should be stalled to fetch a remainder of the instruction from a subsequent memory line, if the instruction is reached as a branch target. This simplifies handling of branch target instructions that straddle different memory lines. The stall bit makes it possible to select whether to locate branch targets immediately following a preceding instruction spread over different memory lines (saving memory space, but at the expense of speed due to stalling) or to realign branch target instructions to the start of a memory line, from where they can be executed after fetching of just one memory line and can be stored even in uncompressed form (gaining a clock cycle at the expense of memory space). Preferably, this selection depends on the frequency with which the instruction will be used as a branch target, the more frequent branch targets being realigned. Preferably, signal to stall is a bit in the instruction dedicated to this purpose.

In embodiment, the computer system is a VLIW system, with instructions that contain operations for different functional units and a header that contains the information with explicit signals. Thus, the overhead for the header is shared by the different operations. The invention is particularly useful for VLIW processors, because they have relatively long instructions that have a high probability of crossing memory line boundaries.

The invention also concerns computer programs (carried by a computer readable medium) for such computer systems. In such programs the explicit signals are set according to the way the instructions are spread over memory lines in order to force the computer system to handle the memory lines efficiently. For example by commanding the system to prefetch memory lines at the right time, to realign if a memory line contains padding or to stall if an instruction that is reached as a branch target spreads over more than one line. The invention also concerns a method of generating such computer programs.

The computer system may comprise multiple processors (e.g. DSPs) on a single chip, such as in the field of embedded systems. However, the computer system may alternatively comprise a computer processor, such as a central processor unit (CPU) being positioned at a local computer device, such as a personal computer, or it may comprise a number of processor units being positioned at a number of computer devices, the computer devices being interconnected in a local or global computer network. Alternatively, it may comprise a processing unit being positioned at a central computer being remote from the local computer device. The central computer device may e.g. be a server device.

Preferably each instruction is provided with a header. That is, to each instruction there is attached a number of bits containing information relating to the instruction word. The header comprises at least one fetch control bit. In addition the header may contain information relating to how to decompress the instruction word, such as information regarding where and how to reinsert non-operative (NOP) bits. The value(s) of the at least one fetch control bit(s) provide(s) information relating to whether sufficient bits have been fetched to enable decompression and execution of the instruction word to be subsequently executed. That is, the header comprises information relating to the instruction word to be subsequently executed as well as to the instruction word to which the header belongs. The fetch control bits may thus provide information relating to whether or not the next memory line should be fetched, whether it is likely that a branch target should be fetched, and in this case how many memory lines it is necessary to fetch in order to enable decompression and execution of the branch target, and/or it may provide any other suitable information relating to how and when which memory lines should be fetched in order to optimize the code size of the compressed VLIW as well as the processor performance, i.e. the code should be as dense as possible, and the computer logic circuitry should be used as efficient as possible.

Sufficient bits have been fetched when all the bits forming the instruction word have been fetched. That is, all of the compressed instruction word should have been fetched from memory before the decompression and execution is started. If this is not the case the computer logic circuitry will have to wait, during the decompression and execution, for the remaining part of the instruction word to be fetched, thereby causing an inefficient use of the computer logic circuitry. It therefore provides a much more efficient utilization of the computer logic circuitry if it is possible to make sure that the instruction word to be subsequently executed is fully available as soon as the execution of the current instruction word has been completed.

The invention even further provides a computer readable medium comprising a computer program as described above. The computer readable medium may e.g. be a stationary computer readable medium, such as a hard disc, read only memory (ROM), such as EPROM or $E^2$PROM, and/or any other suitable kind of stationary computer readable medium. Alternatively or additionally it may be a portable computer readable medium, such as a compact disc (CD), such as a CD-ROM, a floppy disc, a DVD disc, a magnetic tape, a ZIP medium, a portable memory card, and/or any other suitable kind of portable computer readable medium.

BRIEF DESCRIPTION OF THE DRAWINGS

These and other advantageous aspects of the system, methods and programs according to the invention will be described using the following figures.

DESCRIPTION OF PREFERRED EMBODIMENTS

Figure 3:
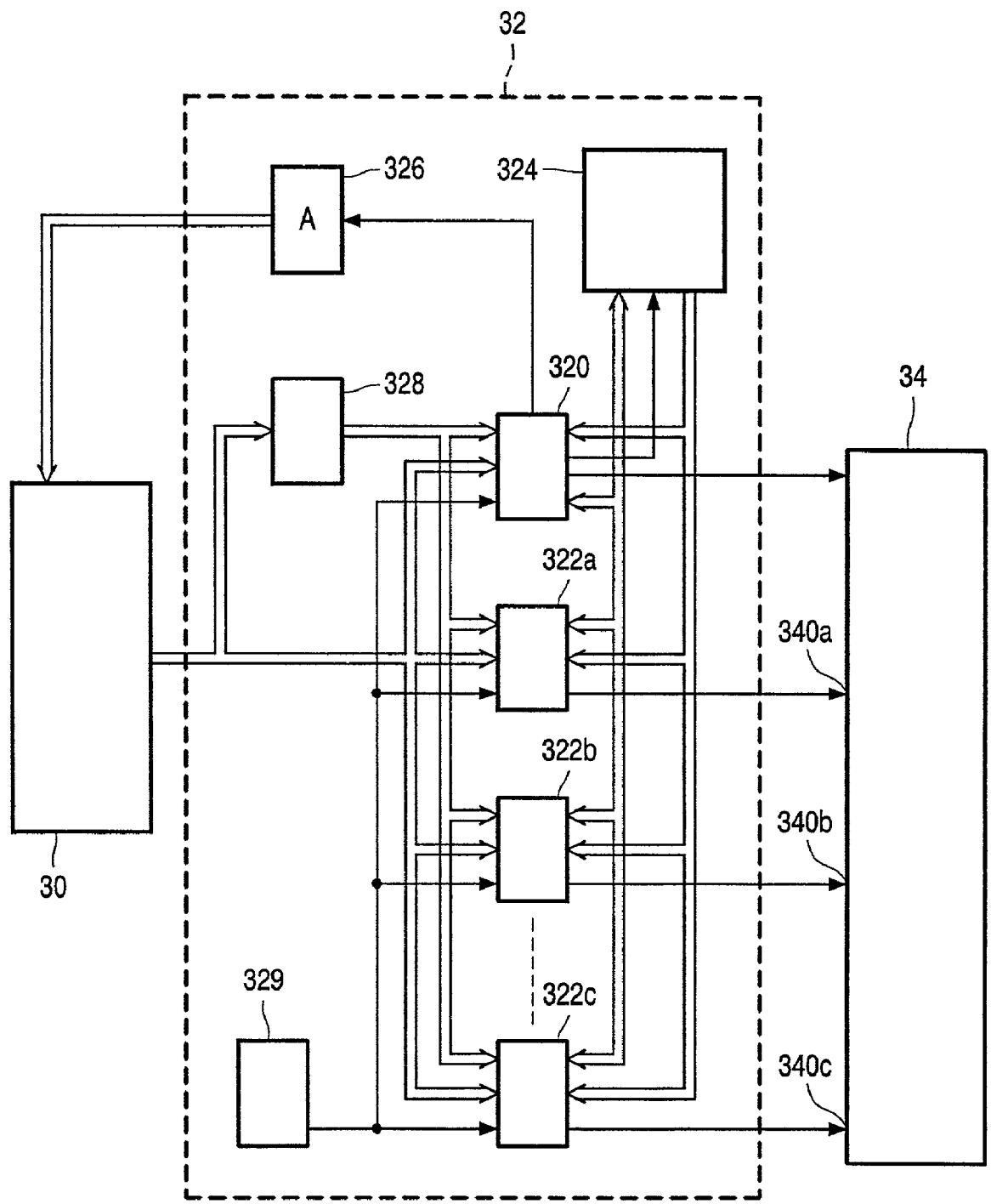
FIG. 3 shows a computer system.

FIG. 3 shows a computer system. Only parts of the system used to explain the invention are shown. The system contains a memory 30, an instruction issue unit 32 and an instruction-processing unit 34. The instruction issue unit 32 contains a header selection unit 320, instruction selection units 322a-c, a selection control unit 324, an addressing unit 326, a previous line register 328 and a NOP source 329. By way of example, three instruction selection units 322a-c are shown, but more or fewer may be used. The addressing unit 326 has an address output coupled to memory 30, which as a data output coupled to the instruction selection units 322a-c. The NOP source 329 is also coupled to the instruction selection units 322a-c. The instruction selection units 322a-c each have an output coupled to a respective one of a number of issue slot inputs 340a-c of the instruction processing unit 34.

The data output of memory 30 is also coupled to the header selection unit 320 and an input of the previous line register 328. The previous line register 328 has an output coupled to the header selection unit 320 and the instruction selection units 322a-c. The header selection unit 320 has outputs coupled to the instruction processing unit 34, the selection control unit 324, the instruction selection units 322a-c and the addressing unit 326. The selection control unit has outputs coupled to the header selection unit 320 and the instruction selection units 322a-c.

Only parts of the system used to explain the invention are shown. For example, clock signal connections to the various components are not shown, nor does the figure show connections for branching, exception handling etc. Also the system will contain various registers (not shown) for buffering information from memory 30 and in processing unit 32. These registers allow the memory 30 and processing unit 32 to perform other actions while information sent to or received from the instruction issue unit 32 is processed or built up by instruction issue unit 32.

In operation, instruction issue unit 32 fetches memory lines from memory 30, decompresses instructions from the memory lines and sends the instructions to the instruction processing unit 34 for execution. The instruction processing unit 34 decodes the instructions, fetches operands of the instruction, executes the instructions and writes back results of the instructions. By way of example, the invention will be discussed for a VLIW processor (VLIW=Very Large Instruction Word), which has a number of issue slots 340a-c for receiving respective instructions (usually called "operations") that the processor will execute in parallel.

In the instruction issue unit 32, addressing unit 326 outputs addresses of memory lines to memory 30. Each memory line (i.e. data from a series of e.g. 8 locations addressed by an address from the addressing unit 326) output from the memory is applied to the instruction selection units 322a-c. Each instruction selection unit 322a-c selects an operation for a respective one of the issue slots 340a-c of the instruction execution unit 34 or a NOP. The operations are selected from the memory line received from memory 30, or from a previous memory line from memory 30, as stored in previous line register 328 or from NOP source 329. NOP source 329 produces NOP (No Operation) instructions (in practice, NOP instructions are so simple that they may also be generated inside instruction selection units 322a-c, NOP source 329 being omitted).

Selection by the instruction selection units 322a-c is controlled by selection control unit 324 and the content of the header, which is selected from the instruction by header selection unit 320. Header selection unit 320 supplies information from the header of an instruction in a memory line received from memory 30 or previous line register 328. This header specifies which of the issue slots 340a-c should receive a no-operation instruction and which of the issue slots 340a-c should receive an operation from an instruction from a memory line. In principle, operations for successive ones of the issue slots 340a-c are located at successive positions in a memory line, followed by successive positions on a next memory line if the instruction is spread over more than one memory line. The position of the operation in the memory line for a specific issue slot 340a-c depends on the number of preceding issue slots 340a-c that receive an operation from the memory line, as indicated by the header. Selection control unit 324 signals the position of the start of the instruction in the memory line to the instruction selection units 322a-c and header selection unit 320. Selection control unit 324 increases the signaled position each time by an amount corresponding to the number of issue slots 340a-c that receive an operation from the memory line rather than a no-operation.

The header in header selection unit 320 supplies additional information from the header that simplifies the hardware needed for fetching of memory lines that contain subsequent instructions. A first bit from the header selection unit 320 is the "prefetch (P) bit". This bit indicates whether the next instruction to be executed is contained in the memory line presently received from memory 30, or whether part or whole of the instruction is contained in a next memory line. In the latter case, addressing unit 326 responds to the prefetch bit by issuing a prefetch command for that next memory line to memory 30. When the next memory line is prefetched, the old memory is copied into the previous line register 328 so that the part of the instruction that is in the previous line can be accessed from there by the instruction selection units 322a-c.

A second bit from the header selection unit 320 is the "realign (R) bit" the realign bit indicates whether the instruction is followed by padding, which should not be executed. If so, the selection control unit 324 will respond to the realignment bit by updating the position indicated to the instruction selection units 322a-c so that this position will point to the start of the next memory line for the next instruction.

A third bit is from the header selection unit 320 the "stall (S) bit". The stall bit indicates whether the present instruction is spread over more than one line in case the last of those lines has not yet been fetched. This will happen typically in case the instruction is a branch target that is spread over more than one line so as to avoid loss of memory space due to realignment. In this case, the instruction processing unit 32 will respond to the stall bit by stalling execution for the period needed to fetch the next memory line that contains the remainder of the instruction.

Figure 1:
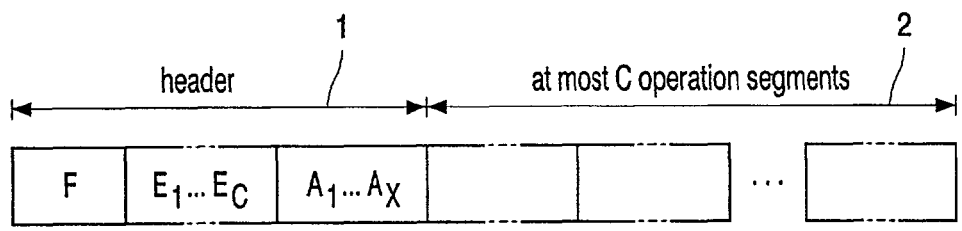
FIG. 1 shows a Variable Length Very Long Instruction Word ($VL^2IW$) instruction format.

Of course, FIG. 1 shows only one example of how the computer system can be implemented. Many variations are possible. For example, instead of using memory lines directly from memory (or from a memory buffer register not shown), one might store the memory lines in a buffer whose contents are shifted under control of the selection control unit 324 each time a new instruction is processed, so that the start of the instruction (containing the header) is always at the same position in the buffer. In this case, no special header selection unit is needed. The instruction selection unit 322a for the first issue slot need not compute how many issue slots with NOPs precede it and can therefore be much simpler than the other instructions selection units 322b-c. This instruction unit only needs to select between the first operation from the instruction and a NOP, under control of the header.

The VL²IW instruction format depicted in FIG. 1 comprises a header 1 followed by a number of operation segments 2. The number of operation segments 2 may not exceed the number of operations which the processor can issue in parallel, in this case C. The header 1 contains C expansion control bits $E_1 \ldots E_C$. In case the $i^{th}$ slot should execute a Non-Operative (NOP) operation, the expansion control bit $E_i$ is '0'. Otherwise it is '1' and the VL²IW contains an operation segment for issue slot i.

When a slot executes a NOP operation, this means that the slot in question is idle during the clock cycle in question. In the VLIW architecture a group of instructions is executed simultaneously. In order to do this it is necessary to ensure that the individual instructions are not dependent on each other. For this purpose it may be necessary to include NOPs in the instructions. When an instruction is compressed this is normally done by removing the NOPs. When the instructions at a later time are to be executed the NOPs have to be re-inserted in order to comply with the requirement that the instructions being executed simultaneously are not dependent on each other.

The header 1 also contains fetch control bits F, which will be described below in connection with FIG. 2. Finally, the header 1 contains a number of auxiliary bits $A_1 \ldots A_X$ that can be used to encode additional operation segment information that does not fit in the operation segments themselves.

Figure 2:
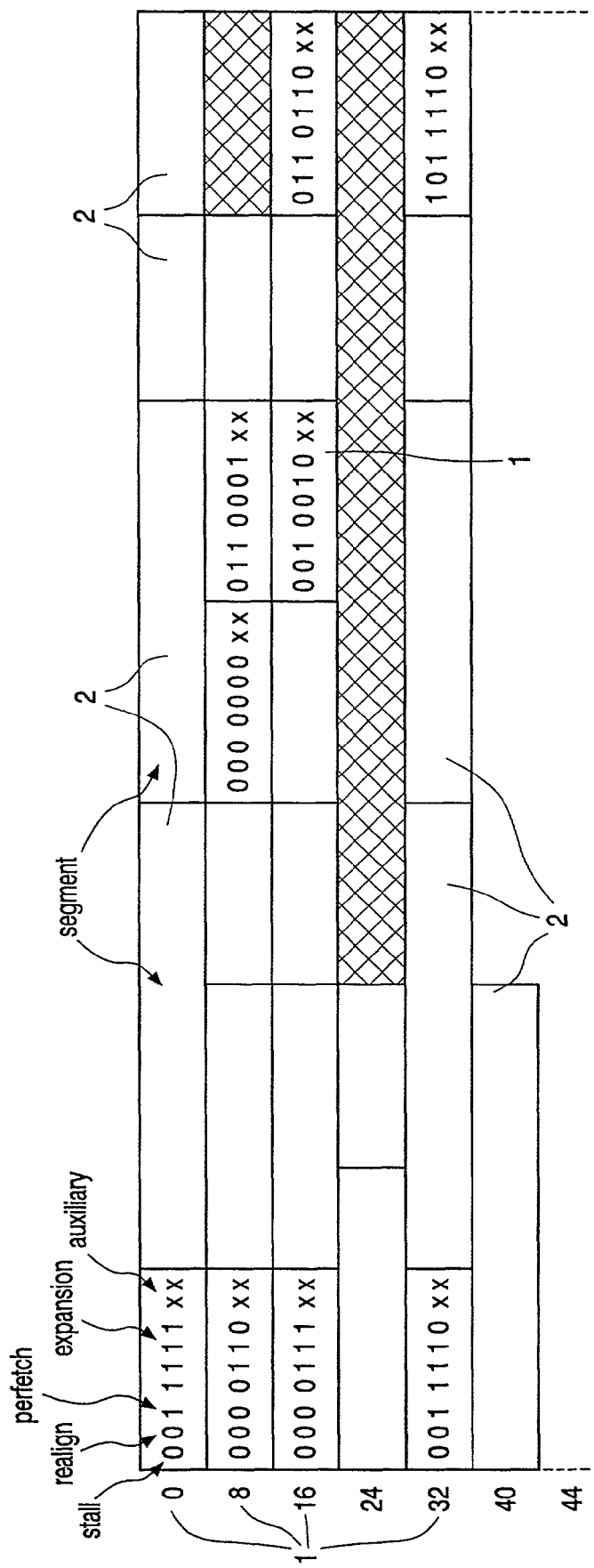
FIG. 2 shows an example of $VL^2IW$ code storage in a code memory.

FIG. 2 shows an example of how VL²IW instructions are stored in program memory. In the figure there is shown six memory lines having a total of nine instructions stored therein, each instruction comprising a header 1 and a number of operation segments 2. A single program memory line can contain (parts of) multiple consecutively stored VL²IW instructions. In a single clock cycle a VL²IW instruction of worst case size (i.e. the size in bits of a VL²IW header followed by an uncompressed VLIW instruction (such as the instruction starting at address 0) can be fetched.

Sequential prefetching ensures that instructions are fetched in time for expansion, decoding and execution. That is, it is ensured that, while executing one instruction, sufficient bits are fetched to enable decompression and execution of the following instruction, so that when execution of the first instruction is completed the following instruction is ready for decompression and execution. This saves processing time.

'Branch prediction' is when a microprocessor tries to predict whether a branch instruction will jump or not, based on a record of what this branch has done previously. If it has, e.g., jumped the last four times then chances are high that it will also jump the next time. When, in a processor where pipelining is used, the processor meets a branch instruction, it will decide which instruction to load next into the pipeline according to the prediction described above. That is, the processor does not know for sure if the correct instruction has been loaded. If it turns out that the prediction is wrong, then the pipeline has to be flushed, and all calculation having been made based on the prediction have to be discarded. Thus, a lot of processing time has been lost. If, however, the prediction turns out to be correct, a lot of time has been saved. Since the branch prediction is performed on the basis of statistical information as described above, it is more likely that the prediction is correct than the opposite. That is, at the end of the day, processing time will most likely have been saved, even though the pipeline will once in a while have to be flushed due to a prediction turning out to be incorrect.

Alternatively to branch prediction other approaches may be used. Processors with undeep pipelines may use bypass logic to obtain the branch address on time. Processors supporting delayed branches may use the branch shadow (i.e. the cycles elapsing between the cycle at which the instruction containing the branch instruction is fetched and the time at which the branch target is fetched) to execute instructions following the branch instruction in the program, but logically belonging to parts of the program that should be executed before the branch is taken. The latter approach is a preferred approach.

Without branch prediction, or a similar approach as described above, a branch target cannot be prefetched on time in case a branch is (predicted) taken. Furthermore, if a branch target VL²IW instruction is spread over two memory lines, fetching the complete branch target takes two cycles, causing a one stall cycle performance penalty (while the processor awaits the fetching of the complete branch target). When the instruction words, including the branch targets, are compressed in order to optimize code size, it cannot be ensured that branch targets are not spread over two memory lines. There would therefore be a significant time penalty if branch prediction was not used. To prevent the stalls a branch target can be positioned at the start of the next program memory line if it does not completely fit on the current program memory line. The realignment of the branch target then requires padding bits on the current line that increase code size.

According to the present invention a combination of stalling on a non-fitting branch target and realignment of a non-fitting branch target is possible. This makes it possible to trade off performance for code size. Of course, if header bits are to be kept to a minimum, solutions with either stalling or realigning are possible as well.

According to the present invention three fetch control bits are defined. These are the stall (S) bit, the realign (R) bit, and the prefetch (P) bit. The prefetch bit is always present. It indicates to the instruction fetch logic of the processor that the next VL²IW instruction to be fetched does not fit on the current memory line, such that the next memory line must be fetched in order to enable decompression and execution of the next instruction. Using this bit eliminates the need for the hardware to determine the right moment of prefetching. The right moment is the moment at which unnecessary fetching is minimized, for example to reduce power dissipation. If the prefetch bit is not used an additional costly calculation on the critical path of the instruction fetch hardware is required.

Dependent on the requirements of the processor instance either the stall bit, the realign bit, or both are used in the instruction format. The realign bit indicates to the instruction expansion logic that the next instruction to be decompressed is realigned, that is, the padding bits following the current instruction should be skipped. On a taken branch, the stall bit indicates to the instruction fetch logic that the instruction being branched to should be fetched in two instead of one cycle, i.e. that a stall cycle is required.

FIG. 2 shows an example of VL²IW code storage in program memory. The first three bits of the header 1 of each instruction word are the stall bit, realign bit, and prefetch bit, respectively. The stall bit, realign bit, and prefetch bit of the first instruction (i.e. the one starting at address 0) have values 0, 0 and 1, respectively. This indicates that there is no need for a stall cycle, the next instruction is not realigned, i.e. there are no padding bits following the current instruction, and the next memory line has to be fetched in order to enable decompression and execution of the next instruction.

It is clear from the figure that no padding bits are following the first instruction, and that all of the next instruction (i.e. the one starting at address 8) is positioned on the following memory line, so that this memory line has to be fetched before decompression and execution of this instruction.

At address 16 a branch target is located that does not completely fit in the previous memory word at address 8. The branch target is realigned to the start of the word at address 16. Therefore padding bits at the end of the word at address 8 are necessary. The realign bit and prefetch bit of the preceding instruction (i.e. the one starting at address 13) have values 1 and 1, respectively, indicating that padding bits follow the current instruction, and that the next memory line (containing all of the next instruction, since it has been realigned to this memory line) should be fetched before decompression and execution of the next instruction.

At address 39 another branch target is located. This target does not completely fit on the memory line starting at address 32. However, this time no realignment is used. Instead a stall is enforced by making the stall bit in the header of the branch target instruction (i.e. the instruction starting at address 39) high (i.e. giving it the value 1). Furthermore, the prefetch bit of the preceding instruction, i.e. the one starting at address 32, has the value 1 indicating that the following memory line has to be fetched before decompressing and executing the next instruction. It is clear from the figure that this is correct, since the next instruction (starting at address 39) straddles the memory lines. Therefore, apart from the part of the instruction which is already available (due to the fact that the memory line starting at address 32 has already been fetched in order to decompress and execute the preceding instruction) it is necessary to make the remaining part of the instruction available, i.e. fetching the next memory line.

The invention is used in the implementation of the instruction fetch and decompress unit in the sequencer of a Digital Signal Processing (DSP) core. The hardware interprets the fetch control bits as follows.

Assume the following definitions:

S=stall on arrival at branch target from branch (S=stall, s=no stall)
R=realign next instruction (R=realign, r=no realign)
P=prefetch next memory line (P=prefetch, p=no prefetch)

There are two ways of reaching an instruction. It may either be reached directly from the preceding instruction, or it may be reached from a taken branch.

When the instruction is reached from a directly (non-taken-branch) preceding instruction, the stall bit is ignored (i.e. the value of the stall bit is not important for the interpretation by the fetch control logic of the fetch control bits), and the other fetch control bits are interpreted as follows:

srp/Srp: the next instruction fits, so do nothing
srP/SrP: the next instruction does not fit, but is not realigned, so prefetch
sRP/SRP: the next instruction does not fit, and is realigned, so prefetch and realign to the next memory line In the first case the next instruction fits on the memory line which has already been fetched. It is therefore not necessary to fetch any additional memory line in order to be able to decompress and execute said instruction.

In the second and third cases the next instruction does not fit. It is therefore, in both cases, necessary to fetch the next memory line before decompressing and executing said instruction. In the second case the following instruction is not realigned, but since the instruction does not fit, it necessarily straddles the memory lines, thus making the prefetch necessary. In the third case the following instruction is realigned, and the current memory line is accordingly provided with padding bits which should be skipped.

When the instruction is reached from a taken branch the fetch bits are interpreted as follows:

srp: branch target fits, next instruction fits, so do nothing
srP: branch target fits, next instruction does not fit, but is not realigned, so prefetch
sRP: branch target fits, next instruction does not fit, and is realigned, so prefetch and realign to next memory line
Srp: branch target does not fit, next instruction fits, so stall to fetch next memory line containing second part of branch target
SrP: branch target does not fit, next instruction does not fit, but is not realigned, so stall and fetch the next memory line containing second part of branch target, prefetch the memory line positioned after the next memory line
SRP: branch target does not fit, next instruction does not fit, and is realigned, so stall and fetch the next memory line containing second part of branch target, prefetch the memory line positioned after the next memory line and realign to the memory line positioned after the next memory line The remarks above concerning the situation in which the instruction is reached from a directly preceding instruction apply equally here. It should thus be clear that the stall bit is indicative of the number of lines which a branch target straddles, that is it indicates whether or not a stall cycle is required in order to allow for all of the branch target to be fetched before decompression is commenced.

Thus, the present invention provides a method of creating, compressing and interpreting Very Long Instruction Words (VLIWs) in such a way that a dense code is obtained while at the same time maintaining the processing performance at a relatively high level, since the invention allows for a trade off between the code density and the processing performance.

Further, the present invention provides a method of creating, compressing and interpreting VLIWs which eliminates several costly calculations that are normally necessary in the feedback loop of the decoder. This is obtained by making information relating to how to fetch the instruction word to be subsequently executed available in the header of the instruction word being currently decompressed and executed.

Even further, the present invention provides a computer system having computer logic circuitry for fetching, decompressing and executing instruction words forming a VLIW in such a way that the VLIW is allowed to be compressed to a dense code, and in such a way that the processing performance is kept at a relatively high level. This is obtained as mentioned above.

Figure 4:
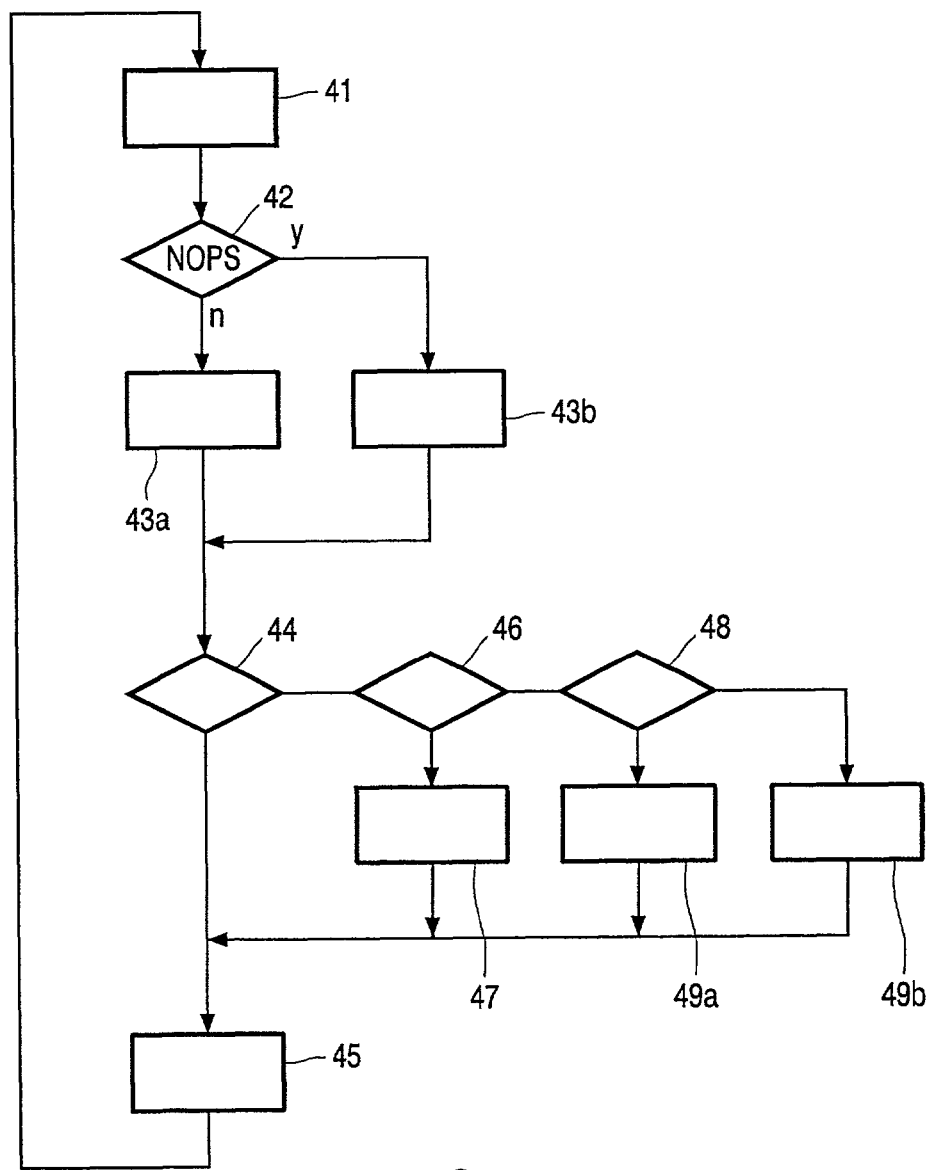
FIG. 4 shows a flow chart of a compilation process.

FIG. 4 shows a flow chart of a instruction generation process for a program of instructions, as executed for example by a compiler program that compiles instructions for the VLIW processor. The flow chart contains a first step 41 in which the operations in an instruction are generated. In the header of the instruction the P, S and R bits are cleared. In a second step 42 it is determined whether the instruction contains NOP operations. If not, a third step 43a is executed which sets the instruction length to the full instruction length and fills the expansion control bits so as to indicate that no issue slot should receive a NOP. If there are NOPs in the instruction, an alternative step 43b is executed, in which the non-NOP operations are moved to the positions of the NOP operations, effectively cutting the NOPS out of the instruction. The expansion control bits are set to indicate the position(s) of the NOPs and the length is set according to the number of non-NOP operations left in the instruction.

In a fourth step 44, it is determined whether the length of the instruction is such that, added to the position of the end of the previous instruction it indicates that the instruction will transgress the end of a memory line. If not, a fifth step is executed, writing the instruction and its header to a computer readable memory for later execution. This may be followed by other housekeeping, such as writing information about the location of the instruction to a label cross-reference table which has entries for such information associated with labels that are assigned to certain instructions, such as branch instructions. After the fifth step 45 the process is repeated from the first step 41.

If the fourth step 44 determines that the instruction, if stored consecutive to the previous instruction, transgresses the memory line, a sixth step 46 is executed. The sixth step 46 determines whether the instruction is a branch target (for example by detecting an entry for the instruction in the label cross reference table, which is generated during a previous compilation stage, or from a tag identifying the instruction as a target during compilation). If the instruction is not a branch target, a seventh step 47 is executed, in which the prefetch bit in the previous instruction is set, to indicate that the instruction spans more than one line. Subsequently, the fifth step 45 is executed.

If the instruction is a branch target, an eight step 48 is executed, to decide whether the instruction should be realigned. Basically, instructions that are executed relatively often will be realigned. This can be decided for example by consulting profile information, from simulated executions of the program in which it is counted how often instructions are executed. If the count from the profile exceeds a threshold, eight step 48 decided to realign the instruction. In that case, a ninth step 49b is executed, in which the realign bit (R) in the previous instruction is set and the position indicator for storing the instruction is incremented to the start of the next memory line. Subsequently the fifth step 45 is executed, storing the instruction at the position indicated by the position indicator.

If the eight step 48 decides not to realign the instruction, an alternative ninth step 49a is executed, in which the stall bit S in the current instruction and the prefetch bit in the previous instruction are set. The position indicator remains unaltered at the end of the previous instruction. Subsequently the fifth step 45 is executed.

Thus, code size is reduced by removing NOPs and/or by allowing instructions to straddle two memory lines without padding. A choice is made whether or not to straddle branch targets, so as to balance the gain in execution speed if the instruction is not straddled against an increase memory size. The stall bit an realign bit ensure that this can be supported by relatively simple hardware. By adding the prefetch bit it is possible to limit prefetching essentially to those memory cycles in which a new memory line is really needed, which reduces thrashing (loss of memory cycles due to unnecessary prefetches).

The invention claimed is:

1. A computer system with a processing unit and a memory, the processing unit being arranged to fetch memory lines from the memory and execute instructions from the memory lines, each memory line being fetched as a whole and being capable of holding more than one instruction, at least one instruction from the memory lines comprising information, inserted at compile time, that signals explicitly how the processing unit, when processing the instruction from a current memory line, should control how a part of processing is affected by crossing of a boundary to a subsequent memory line, the processing unit being arranged to respond to the information by controlling said part of processing as signaled by the information, said information including at least a fetch bit and a realign bit, wherein the fetch bit signals explicitly whether or not the subsequent memory line has to be fetched during processing of the instruction, the processing unit being arranged to start fetching of the subsequent memory line in response to the explicit signaling by the fetch bit, and wherein the realign bit signals explicitly whether or not an instruction pointer should be updated from a position behind the instruction in the current memory line to a start of the subsequent memory line, so that information following the instruction on the current memory line is skipped over, the processing unit being arranged to update the instruction pointer to the start of the subsequent memory line in response to the explicit signaling by the realign bit.

2. The computer system according to claim 1, wherein the information signals explicitly whether or not processing of the instruction should be stalled, when the instruction is reached from a branching instruction, processing being stalled to fetch the subsequent memory line that contains a part of the instruction, the processing unit being arranged to stall in response to the information when the instruction is reached from the branching instruction.

3. The computer system according to claim 1, the processing unit being a VLIW processing unit containing two or more issue slots for issuing operations from the instruction in parallel to different functional units, the instructions being VLIW instructions, capable of containing two or more operations, the instruction comprising a field distinct from the operations to specify said information.

4. The computer system according to claim 3, the field comprising, in addition to said information, a decompression code that specifies for which issue slots the instruction contains operations.

5. The computer system of claim 1 wherein the current memory line and subsequent memory line are positioned adjacent the boundary.

6. The computer system of claim 1 wherein the fetching of the subsequent memory line consists of fetching a single memory line.

7. A method of processing instructions in a computer system with a processing unit and a memory, the processing unit being arranged to fetch memory lines from the memory and execute instructions from the memory lines capable of holding more than one instruction, at least one instruction from the memory lines comprising information, inserted at compile time, that signals explicitly how the processing unit, when processing the instruction from a current memory line, should control how a part of processing is affected by crossing of a boundary to a subsequent memory line, said information including at least a fetch bit and a realign bit, wherein the fetch bit signals explicitly whether or not the subsequent memory line has to be fetched during processing of the instruction, and wherein the realign bit explicitly signals whether or not an instruction pointer should be updated from a position behind the instruction in the current memory line to a start of the subsequent memory line, the method comprising:

fetching each memory line as a whole, processing an instruction from a current memory line, reading the information from the instruction during processing and controlling said part of processing as signaled by the information, wherein said controlling comprises starting fetching of the subsequent memory line if fetching is explicitly signaled by the fetch bit, and causing a program counter to skip to a start of the subsequent memory line if said skip is explicitly signaled by the realign bit.

8. The method of claim 7 wherein the current memory line and subsequent memory line are positioned adjacent the boundary.

9. The method of claim 7 wherein the fetching of the subsequent memory line consists of fetching a single memory line.

\* \* \* \* \*

UNITED STATES PATENT AND TRADEMARK OFFICE
CERTIFICATE OF CORRECTION

| | | |
|---|---|---|
| PATENT NO. | : 7,873,813 B2 | Page 1 of 1 |
| APPLICATION NO. | : 10/059427 | |
| DATED | : January 18, 2011 | |
| INVENTOR(S) | : Jeroen Anton Johan Leijten | |

It is certified that error appears in the above-identified patent and that said Letters Patent is hereby corrected as shown below:

On the Title page

Item [30] is missing and should read:

"(30)         Foreign Application Priority Data

Jan. 30, 2001         (EP).......................01200333.1"

Signed and Sealed this
Twenty-ninth Day of November, 2011

David J. Kappos
*Director of the United States Patent and Trademark Office*